United States Patent [19]

Wuertz

[11] Patent Number: 4,577,055
[45] Date of Patent: Mar. 18, 1986

[54] POWER POLE WIRING ASSEMBLY
[75] Inventor: Emil S. Wuertz, Madison, Conn.
[73] Assignee: Harvey Hubbell Incorporated, Orange, Conn.
[21] Appl. No.: 570,964
[22] Filed: Jan. 16, 1984
[51] Int. Cl.⁴ .............................................. H02G 3/04
[52] U.S. Cl. ..................................................... 174/48
[58] Field of Search .................................... 174/48, 49

[56] References Cited
U.S. PATENT DOCUMENTS
3,609,211  9/1971  Van Herk .............................. 174/49
4,015,397  4/1977  Flachbarth et al. ............... 174/48 X OTHER PUBLICATIONS
Two-page, undated brochure entitled "The Hubbell Power Pole" Form 4214 of Wiring Device Division of Harvey Hubbell Incorporated.

Primary Examiner—A. T. Grimley
Assistant Examiner—D. A. Tone
Attorney, Agent, or Firm—Jerry M. Presson; Walter C. Farley

[57] ABSTRACT

A power pole is provided with a wiring assembly including a mounting plate having openings for mounting screws and openings suitable positioned to be aligned with communication and power chambers in the pole to permit the egress of wires therefrom. The plate is supplied with threaded holes to mate with mounting holes in an extension ring to form a junction box on the plate. A separate barrier member is mountable on the same mounting screws as the plate and divides the extension ring into communication and power chambers. The wiring assembly is therefore a multi-purpose assembly permitting substantial flexibility in the connection of wires emerging from within the pole.

3 Claims, 8 Drawing Figures

POWER POLE WIRING ASSEMBLY

This invention relates to an improved wiring assembly for terminating a power pole, specifically a pole having communication and power chambers therein.

BACKGROUND OF THE INVENTION

A power pole is a structure which permits electrical power or communication cables or wires to be positioned at nearly any location in a relatively large room, and is often used in a large stenographic or other work area in which flexibility in the location of work stations is desired and in which the power is available above a false ceiling or the like.

While power poles have been available for some time, the ability to adapt these poles to the variety of situations commonly encountered in installation work has been quite limited.

BRIEF SUMMARY OF THE INVENTION

Accordingly, it is an object of the present invention to provide a wiring assembly which permits greater flexibility and ease of installation of the upper termination of the communication and power cables which extend through the pole.

Briefly, the invention includes a power pole wiring assembly in which the pole is of the type having an elongated housing dimensioned to extend from above a false ceiling down to a desk or floor surface, the pole having an elongated barrier dividing the interior volume of the housing into power and communication chambers for receiving power wires and communication wires, respectively, which extend between outlet locations along the pole and the upper end thereof. The assembly includes a flat, rectangular, stiff metal mounting plate each side of which is significantly longer than any cross-sectional dimension of the top of the housing. First and second mounting holes are provided in the plate and are positioned to be aligned with mounting openings in the upper end of the pole so that threaded fasteners can be passed therethrough to fixedly attach the plate to the top of the pole across the open end thereof. The plate has a first wire hole through which wires from the communication chamber can pass, this first hole being aligned with the communication chamber when the mounting holes are aligned with the mounting openings. The plate also has a second wire hole, similarly aligned, for passing wires through the plate from the power chamber, and a plurality of threaded holes through the plate near the edges thereof, the threaded holes being positioned for alignment with standard mounting holes in any one of a plurality of sizes of extension rings so that a selected extension ring can be mounted on the plate to thereby form a junction box. The assembly further includes an extension barrier which has a wall portion and a flange portion, the flange portion being attachable to the plate using the threaded fasteners by which the plate was mounted on the pole, the wall portion of the barrier then being aligned with the elongated barrier which separates the interior volume of the housing.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 a simplified foreshortened perspective view of a power pole of the type to which the invention relates;

DETAILED DESCRIPTION OF THE DRAWINGS

Figure 1:
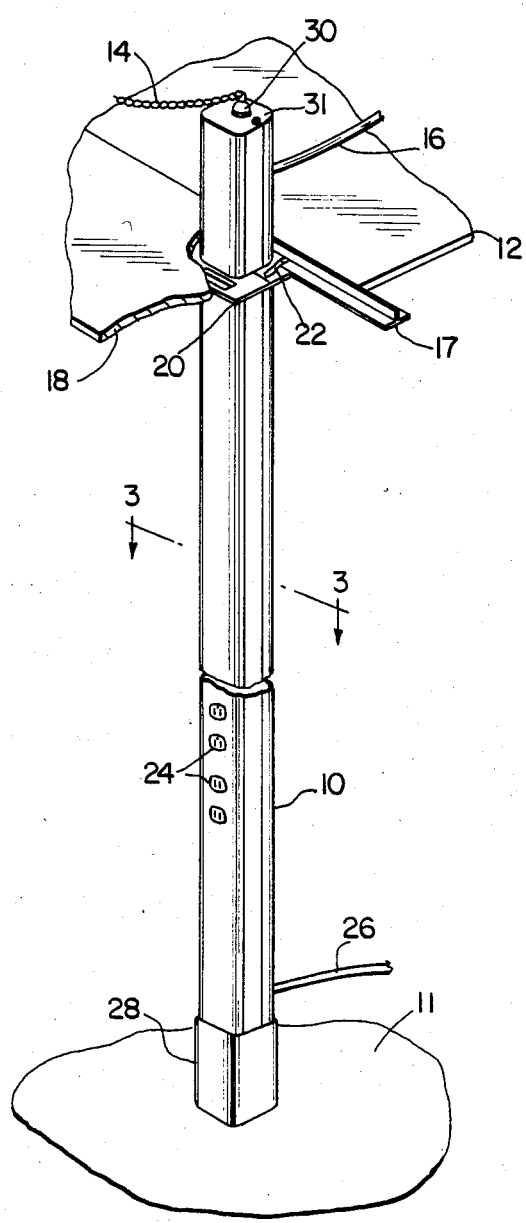

A power pole of the type with which the invention is concerned is illustrated in FIG. 1 wherein a pole 10 extends upwardly from a floor 11 or other surface through a false ceiling 12 above which is a space having provision for cables, such as cable 14 for connection to a source of electrical energy and also cables 16 for data communication, telephone communication or the like. Such a false ceiling is normally provided with a network of brace members 17 with removable panels 18 resting on the brace members. The pole itself is provided with a mounting flange 20 having clips 22 or the like which can be attached to the frame network 17, the flange 20 being longitudinally adjustable along the pole to accommodate various dimensional relationships.

Power poles of this type, as previously suggested, are quite often used in situations where a large room is to be subdivided into a number of offices or work spaces using movable partitions and the like rather than erecting permanent walls. A power pole such as that shown in FIG. 1 can be provided with the lower end resting on the floor or, in some situations, a desk top or the like such that power receptacles 24 are available at a convenient location and height, and a cable 26 can be connected to telephone equipment, facsimile equipment, data transmission terminals or other devices. Preferably, the lower end of the pole is provided with a scuff boot 28 and, at the bottom, a VELCRO pad which can engage a carpet, if one exists, or another VELCRO pad which can be adhered to floor 11, thereby keeping the bottom of the pole in its desired position.

Figure 2:
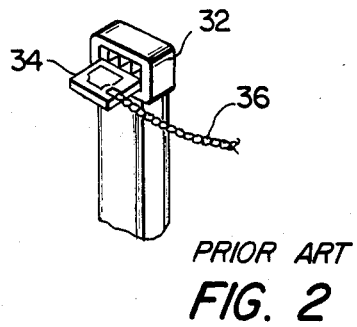
FIG. 2 is a partial perspective view of the upper end of a power pole showing a different form of power wire termination thereon.

Cable 14 can be connected, as shown, through a conventional fitting 30 attached to a simple cover plate 31, fitting 30 being a conventional fitting of the type used with junction boxes to accommodate BX or other cable. It is then necessary to extend the communication cable 16 out through a knock-out or other opening in the side of the upper portion of the pole. Alternatively, the power connection can be made through a flexible wiring interface as illustrated in FIG. 2 wherein the top of the pole is provided with a mounting box 32 which has one-half of an electrical connector therein, the other half 34 of the connector being connected to a cable 36 which extends to the electrical supply. This form of wiring, which is sometimes referred to as a manufactured wiring system, is desirable in some circumstances because of its flexibility but can also involve greater cost.

In either situation, the decision of which kind of power connection to use is made at the outset and very little flexibility as to the connections to a particular power pole are thereafter available. Furthermore, changes can require replacement of unnecessary lengths of cable, a very expensive and time-consuming requirement.

Figure 3:
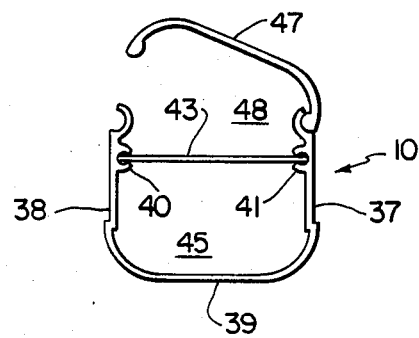
FIG. 3 is a transverse sectional view of the power pole of FIG. 1 along lines 3—3.

As seen in FIG. 3, the power pole includes fixed sidewalls 37, 38 and 39 which can be extruded using a metal, such as aluminum, or a polymeric material, the extrusion being provided with inwardly protruding portions 40 and 41 defining longitudinal slots to receive an elongated barrier 43 which closes off one-half of the interior volume of the pole to form a power chamber 45. The extrusion also has outwardly opening lips which can receive a movable sidewall 47, shown in a partly removed position, the barrier along with wall 47 forming a second chamber 48 which comprises a communication wiring chamber when wall 47 is closed. The wall is removable to permit access and connection to the wires therein.

Thus, it will be seen that the longitudinally extending power and communication channels receive significant lengths of wire which extend to the upper end of the pole and must be led to or somehow connected to other wires of a similar type.

Figure 4:
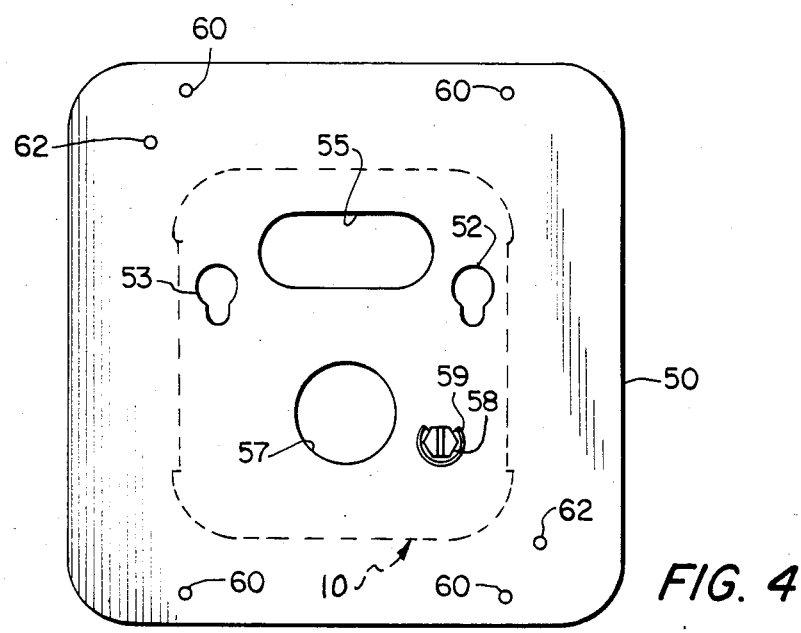
FIG. 4 is a top plan view of a mounting plate in accordance with the invention.
Figure 5:
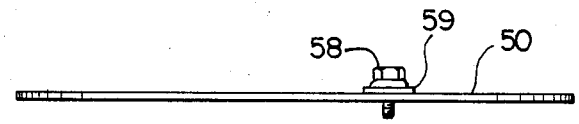
FIG. 5 is a side elevation of the plate assembly of FIG. 4.

In order to permit maximum flexibility in this regard, a plate such as shown in FIGS. 4 and 5 can be provided at the top of the pole in place of the devices shown in FIGS. 1 and 2. This plate 50 forms the basic component of the improved wiring assembly in accordance with the invention and comprises a substantially flat metal plate of galvanized steel or the like having side dimensions which are significantly longer than the cross-sectional dimensions of the pole with which it is to be used. Thus, with a power pole which is about 2.5 inches square, the plate is approximately 4.75 inches on a side. The plate is to be stiff and should be at least 0.062 inches in thickness.

Keyhole-shaped mounting holes 52 and 53 are positioned so that the smaller portions thereof are alignable with the tops of the elongated slots in protruding portions 40 and 41, these slots being dimensioned so that the upper ends thereof are typically 0.130 inches in diameter and can receive the threaded portions of conventional sheet metal screws. Thus, the slots also form mounting means for the plate.

Between these mounting holes and on the communication side of the pole, shown in outline only, is a first wire hole 55 which can be formed as a knockout pressed back into place after manufacture, permitting the installer to easily remove that portion upon installation if needed. Opening 55 is elongated in a direction which is parallel with the line joining openings 52 and 53 to permit a variety and relatively large number of communication wires to pass therethrough.

On the other side of the line between the mounting holes is a second wire opening 57 which is provided to permit access of power lines. Opening 57 can be made as a circular hole, as illustrated, for the purpose of permitting the wires to pass through, or, alternatively, receiving a fitting such as fitting 30 if desired so that the wires can be clamped. Normally, however, no wire clamp is needed. A threaded opening is provided in the vicinity of hole 57 to receive a grounding screw 58 which, in conjunction with a washer 59, can receive and firmly hold a grounding wire coming through opening 57.

At the corners of a rectangle are four threaded holes 60 which are spaced apart in a pattern which matches the mounting holes of a standard 4 11/16 inch square extension ring, the holes being threaded to receive #8-32 machine screws, permitting the mounting of such a box. Additionally, two holes 62, similarly threaded, are inwardly spaced to mate with the mounting screws for a standard 4 inch square extension ring, giving the installer the option of using either size ring.

Figure 6:
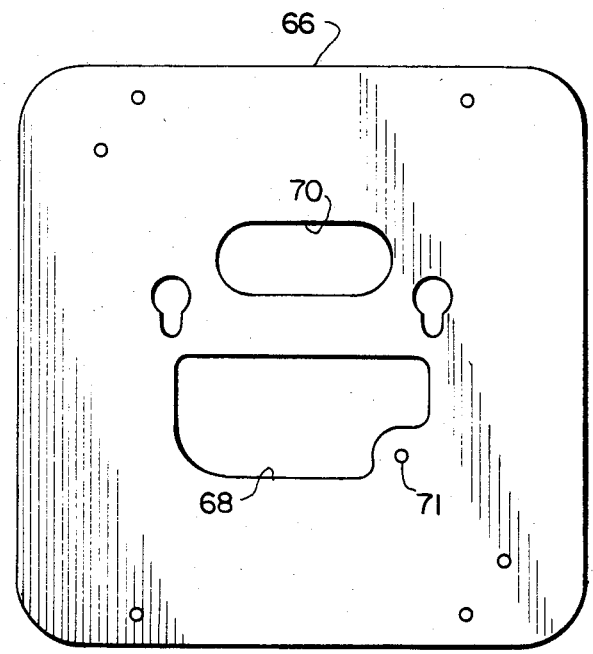
FIG. 6 is a top plan view of a further embodiment of a mounting plate in accordance with the invention.

A further embodiment of a mounting plate in accordance with the invention is shown in FIG. 6 wherein plate 66 is provided with similar mounting openings and a communication wire opening, but wherein the power wire opening 68 is substantially larger and is elongated in the same direction as communication wire openings 70, permitting the emergence of a significantly larger number or larger size of power cables. The corner of opening 68 is abbreviated to provide a threaded hole 71 for a grounding screw, such as screw 58.

Figure 7:
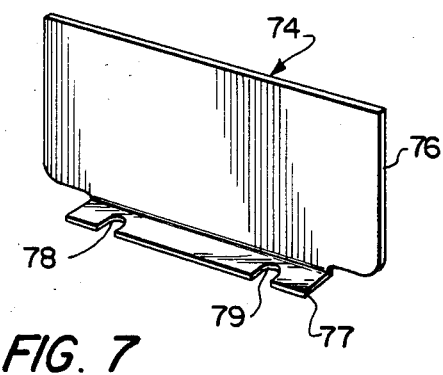
FIG. 7 is a perspective view of an extension barrier plate in accordance with the invention.

The wiring assembly further includes a barrier extension plate indicated generally at 74 (FIG. 7) which has a wall portion 76 and a relatively short, narrow flange portion 77 having U-shaped openings 78 and 79 formed therein. Openings 78 and 79 are spaced apart by the same distance as mounting holes 52 and 53 and the openings are U-shaped so that the barrier can be installed on the plate by loosening, but not removing, the mounting screws and slipping the flange of the plate in place with the screws entering openings 78 and 79. In this situation, wall 76 extends perpendicular to plate 50 or plate 66 and lies in substantially the same plane as barrier 43 within housing 10. It thus comprises an extension barrier, dividing the interior of the extension ring into power and communication chambers.

Figure 8:
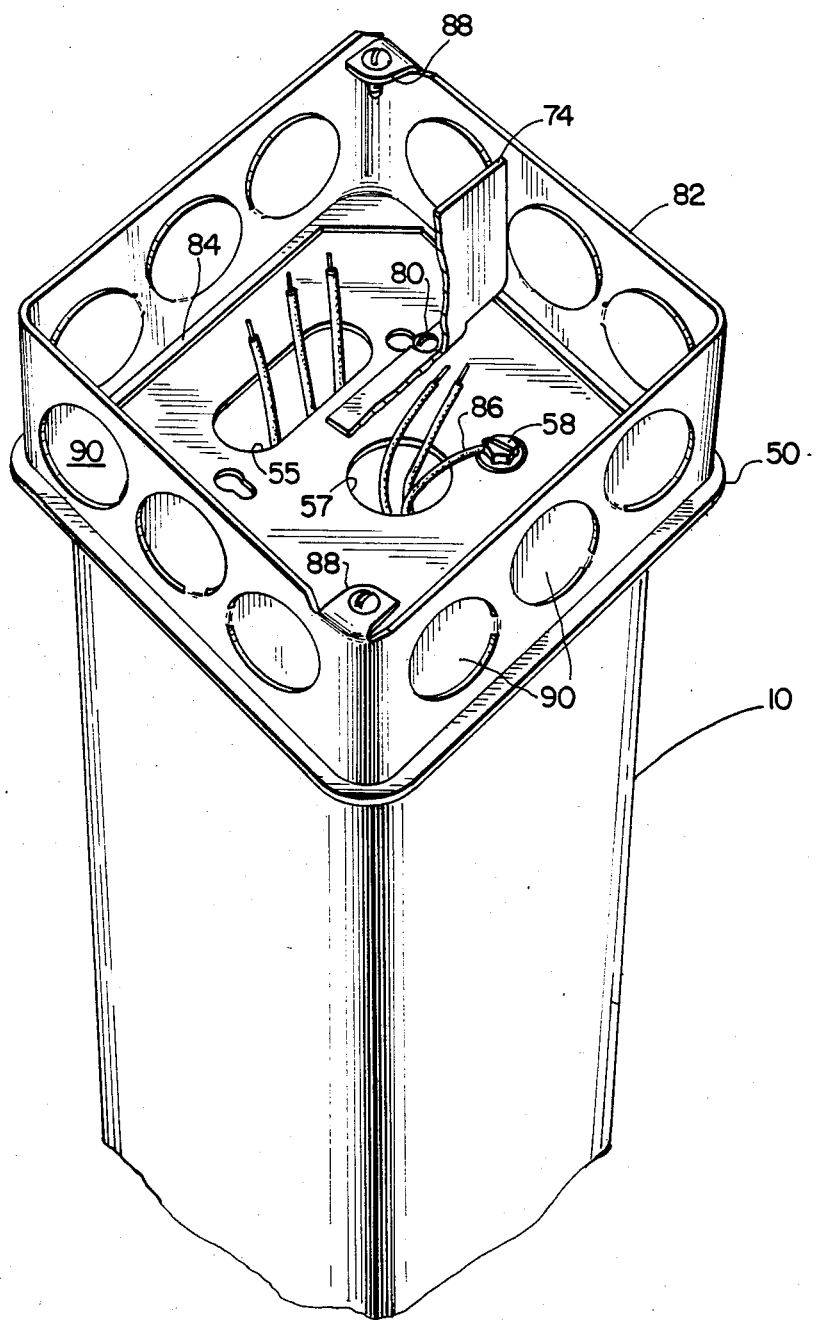
FIG. 8 is a perspective view of the top portion of a power pole having a wiring assembly in accordance with the invention mounted thereon.

FIG. 8 shows, in perspective form, an assembly which includes a power pole 10 having a plate 50 mounted thereon, plate 50 being secured to the mounting pole by screws 80. A barrier extension 74 is also mounted on screws 80, separating the interior of an extension ring 82 into communication and power chambers. The extension ring itself has an inwardly extending mounting flange 84 which protrudes inwardly from the bottom of all walls, the mounting flange having openings alignable with openings 60 or 62. Opening 55 is visible in FIG. 6 and has a plurality of communication wires extending therethrough, and opening 57 similarly has power wires extending therethrough, including a ground wire 86 which is attached in a firm electrical and mechanical manner by screw 58 and washer 59.

Extension ring 82 is provided with mounting mean 88 permitting the mounting of a cover plate thereon to form a junction box arrangement. Knockouts 90 are provided in a conventional manner to permit the wires within the two chambers to be connected to cables passing through the sides of the extension ring, suitable fittings being used in accordance with code and practical electrical requirements.

As will be recognized, the wiring assembly thus formed permits a known, predetermined length of communication and electrical wires to be supplied to the interior of the pole, regardless of the requirements which may be imposed upon it by distances to other connection points, such as sources of electrical power or communication cable junction boxes. Furthermore, the wires provided within the housing are substantially independent, as to length, of changes in that reconnections can also be made within the extension ring 82 without having to replace the wires within the power pole itself.

Furthermore, if desired, extension ring 82 can be covered by a junction box cover having an access opening of a type suitable to receive either a cable clamp 30 or a connector 32, permitting the power to be handled in either of the previously suggested ways and permitting the communication side to be handled completely independently thereof.

While certain advantageous embodiments have been chosen to illustrate the invention it will be understood by those skilled in the art that various changes and modifications can be made therein without departing from the scope of the invention as defined in the appended claims.

What I claim is:

1. A multi-purpose power hole wiring assembly for use with a power hole of the type having an elongated housing dimensioned to extend from a location above a false ceiling down to a surface below the ceiling, an elongated barrier dividing the interior volume of the housing into power and communication chambers for receiving power wires and communication wires, respectively, extending between outlet locations along the pole and the top of the pole, the housing top further comprising means having mounting openins protruding inwardly from opposite sides thereof, the wiring assembly comprising the combination of a flat, rectangular, stiff, metal mounting plate, each side of which is significantly longer than any cross-sectional dimension of the top of the housing;

first and second mounting holes through said plate alignable with said mounting openings for receiving threaded fasteners to attach said plate to the top of said pole across the open end thereof above said ceiling;

a first wire hole through said plate for passing wires therethrough to and from said communication chamber, said first wire hole being aligned with said communication chamber when said mounting holes are aligned with said mounting openings;

a second wire hole through said plate for passing wires therethrough to and from said power chamber, said second wire hole being aligned with said power chamber when said mounting holes are aligned with said mounting openings;

a plurality of sets of threaded holes through said plate, each set being positioned to be uniquely alignable with standard mounting holes in one extension ring selected from a plurality of extension rings of different sizes to permit mounting said one extension ring on said plate to thereby form a junction box on said plate; and an extension barrier having a wall portion and a flange portion, said flange portion having openings alignable with said mounting openings for attachment of said barrier with the same threaded fasteners holding said plate, said wall portion being substantially aligned with the barrier in said pole.

2. An assembly according to claim 1, wherein said second wire hole is circular.

3. An assembly according to claim 1, wherein said first and second wire holes are elongated in directions parallel with the plane containing said wall portion of said barrier.

* * * * *